March 27, 1934.  C. J. BRISTOL  1,952,906

WHEEL STOP FOR AUTOMOBILE LIFTS

Filed Sept. 14, 1931

Inventor
Cyrus J. Bristol
by Orwig & Hague Attys.

Patented Mar. 27, 1934

1,952,906

UNITED STATES PATENT OFFICE 1,952,906

WHEEL STOP FOR AUTOMOBILE LIFTS

Cyrus John Bristol, Des Moines, Iowa, assignor to Globe Machinery & Supply Company, Des Moines, Iowa, a corporation of Iowa Application September 14, 1931, Serial No. 562,730

2 Claims. (Cl. 254—89)

The object of my invention is to provide a device in the nature of an attachment to be applied to automobile lifts and designed to automatically place a wheel stop device in position on a wheel rail for preventing a car from passing off of the wheel rail during the initial upward movement of the wheel rail, and to automatically lower to inoperative position upon the completion of a downward movement of the wheel rail.

More specifically it is the object of my invention to provide a wheel stop device of simple, durable and inexpensive construction designed to be used as an attachment for automobile lifts and including a wheel stop plate so arranged that it normally lies flat on top of the wheel rail, and upon the initial upward movement of the wheel rail, the wheel stop plate is automatically elevated to position for stopping a wheel from moving off the end of the wheel rail, and when the lift is again lowered, the wheel stop plate will be automatically folded to its inoperative position.

My invention consists in the construction, arrangement and combination of the various parts of the device, whereby the objects contemplated are attained, as hereinafter more fully set forth, pointed out in my claims, and illustrated in the accompanying drawing, in which:

Figure 1:
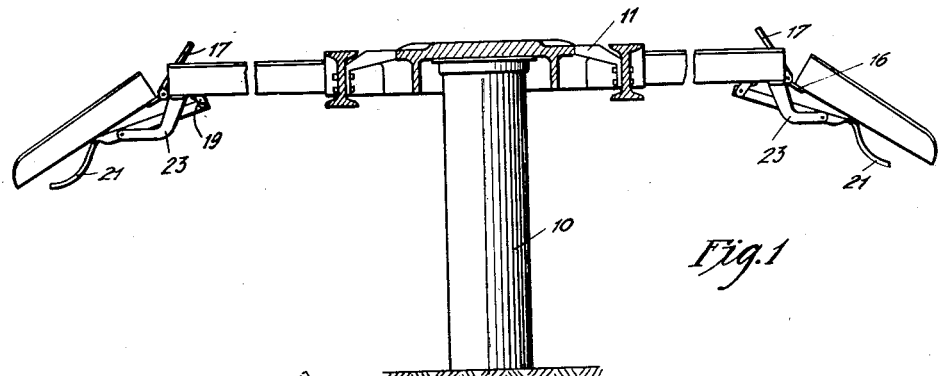
Figure 1 shows a vertical, central, sectional view of a fluid pressure automobile lift device having my improved wheel stop attachments applied thereto.

Automobile lifts now in general use usually include a piston 10, a frame 11 at the top, and two parallel wheel supporting rails 12 which are ordinarily trough shaped, and it is also customary to have at each end of each wheel rail a ramp inclined downwardly from the wheel rail and designed to rest upon the floor surface when in a lowered position.

My improved wheel stop device, which may be used in the nature of an attachment for automobile lifts already in use, comprises a hinged plate 13 designed to be fixed to the under surface of the wheel rail at the end thereof, and to support a pintle 14. A ramp 15 of ordinary construction is secured to a hinged plate 16 which is mounted on the pintle 14.

Figure 2:
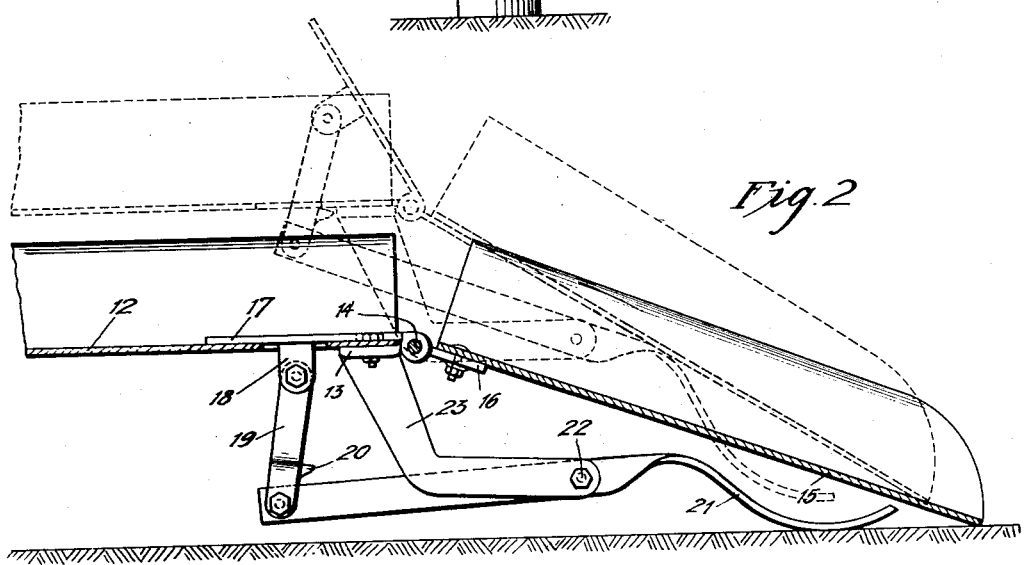
Figure 2 shows an enlarged, detail, vertical, sectional view through one end of a wheel supporting rail and a ramp connected thereto and illustrating my improved wheel stop device, the dotted lines showing the wheel supporting rail partly elevated and the wheel stop plate moved to its operative position, and taken on the line 2—2 of Figure 3.
Figure 3:
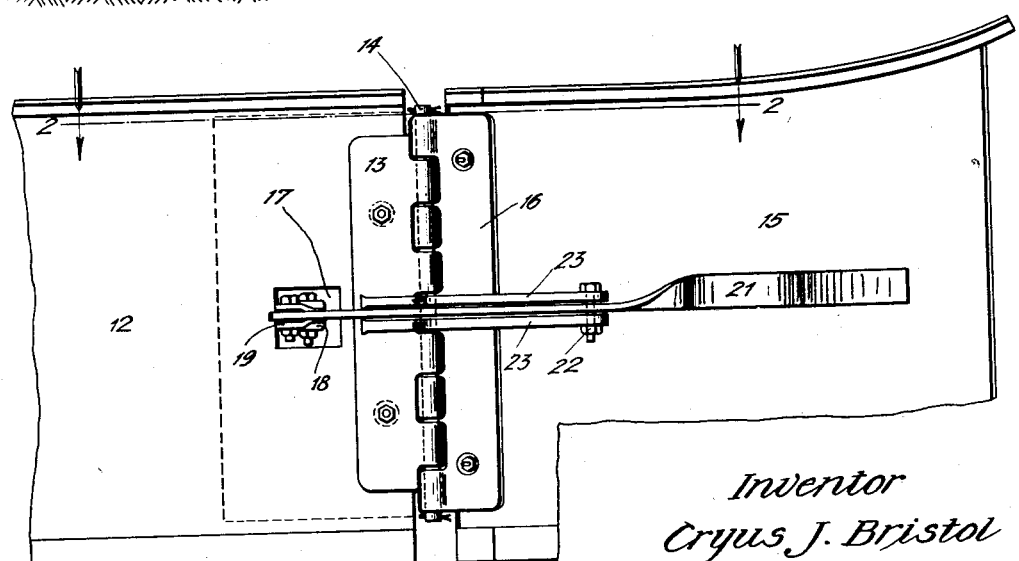
Figure 3 shows an inverted plan view of same.

Pivotally mounted on this same pintle 14 is a wheel stop plate 17 which normally lies flat upon the top of the wheel rail 12, but which may be moved to a position inclined upwardly and away from the rail, as shown by dotted lines in Figure 2.

On the under surface of the wheel stop plate is a lug 18, and pivoted to this lug is a link 19 having a shoulder 20 thereon. Pivoted to the link 20 is a lever 21 fulcrumed at 22 to a bracket 23 fixed to the wheel rail.

In practical operation, and when the lift is in its fully lowered position, the ends of the wheel rails are usually several inches above the floor, and the ramps 15 normally incline downwardly. The lever 21 is so positioned and shaped when the ramp is in its normally at rest position, shown by solid lines in Figure 2, that the lever 21 will stand close to, but not touch, the ramp. Then during the initial part of the upward movement of the lever, the end of the lever 21 will engage the under surface of the ramp, and thereby move the opposite end of the lever upwardly. This will cause the link 19 to push the wheel stop plate upwardly until the shoulder 20 engages the under surface of the wheel rail, whereupon further upward movement of the wheel stop plate will be limited to the position shown by dotted lines in Figure 2, and when that point is reached, further downward movement of the outer end of the ramp will be prevented by the lever 21.

When the lift is again lowered, the outer end of the lever will engage the floor and thereby force the wheel stop plate 17 to move to its inoperative position lying flat upon the bottom of the wheel rail.

The operation of the stop device, both in moving to its position for stopping a wheel from rolling off of the wheel rail, and also to its inoperative position, is entirely automatic and requires no attention by the operator.

I claim as my invention:

1. A wheel stop for automobile lifts comprising a wheel supporting rail, a ramp pivoted thereto, a wheel stop plate pivoted to the rail, a link pivoted to the stop plate, means for limiting the upward movement of the stop plate to a position inclined upwardly and away from the ramp, a bracket fixed to the wheel rail, and a lever fulcrumed to said bracket and pivoted to said link, said parts being so constructed that when the ramp is elevated it will move the stop plate to its wheel stopping position, and when the wheel rail is in its lowered position the free end of the lever will engage the floor and thereby be elevated to force the plate to move to position flat against the wheel rail.

2. The combination with an automobile lift having a wheel supporting rail and a pivoted ramp, of a wheel stop plate normally positioned flat against the wheel supporting rail and capable of swinging upwardly to position for forming a wheel stop, a link connected to the wheel stop plate, a lever fulcrumed to the wheel supporting rail and having one end attached to said link and its other end in position under the pivoted ramp and capable of being engaged by the ramp and moved downwardly thereby when the wheel supporting rail is moved upwardly, to thereby elevate the wheel stop.

CYRUS JOHN BRISTOL.